(12) United States Patent
Ramos

(10) Patent No.: US 10,854,073 B1
(45) Date of Patent: Dec. 1, 2020

(54) IWITNESS

(71) Applicant: Ramon Ramos, San Antonio, TX (US)

(72) Inventor: Ramon Ramos, San Antonio, TX (US)

( * ) Notice: Subject to any disclaimer, the term of this patent is extended or adjusted under 35 U.S.C. 154(b) by 0 days.

(21) Appl. No.: 16/845,940

(22) Filed: Apr. 10, 2020

(51) Int. Cl.
*G06K 9/00* (2006.01)
*G08G 1/017* (2006.01)
*B60R 11/04* (2006.01)

(52) U.S. Cl.
CPC ............ *G08G 1/0175* (2013.01); *B60R 11/04* (2013.01); *G06K 9/00825* (2013.01); *B60R 2300/105* (2013.01); *B60R 2300/302* (2013.01); *G06K 2209/23* (2013.01)

(58) Field of Classification Search
CPC ........ H04N 5/00; G06K 9/00; G06K 2209/00; G08G 1/00; B60R 11/00; B60R 2300/00
See application file for complete search history.

(56) References Cited

U.S. PATENT DOCUMENTS

| | | | |
|---|---|---|---|
| 2017/0174227 A1* | 6/2017 | Tatourian | G06K 9/3241 |
| 2019/0197369 A1* | 6/2019 | Law | G06N 3/08 |

* cited by examiner

*Primary Examiner* — Maryam A Nasri
(74) *Attorney, Agent, or Firm* — Botkin & Hall, LLP

(57) ABSTRACT

A method of recording and reporting traffic violations using a central recording unit that has at least one video camera and possibly additional still and video cameras. Additionally, there may be other cameras that interface with the central recording unit. The central recording unit is mounted to a vehicle in which it is used and may be connected to a separate gateway device that can transmit data to a violation recording center that will process data taken by the central recording unit. The violation recording center will evaluate whether data taken regarding other motorists warrants sending a fine to a non-compliant driver who is violating traffic laws. The method of this system provides for recording data regarding the non-compliant driver for a time before activation to a time after activation so that a full data bundle may be reviewed to determine whether a violation of traffic laws has occurred.

8 Claims, 9 Drawing Sheets

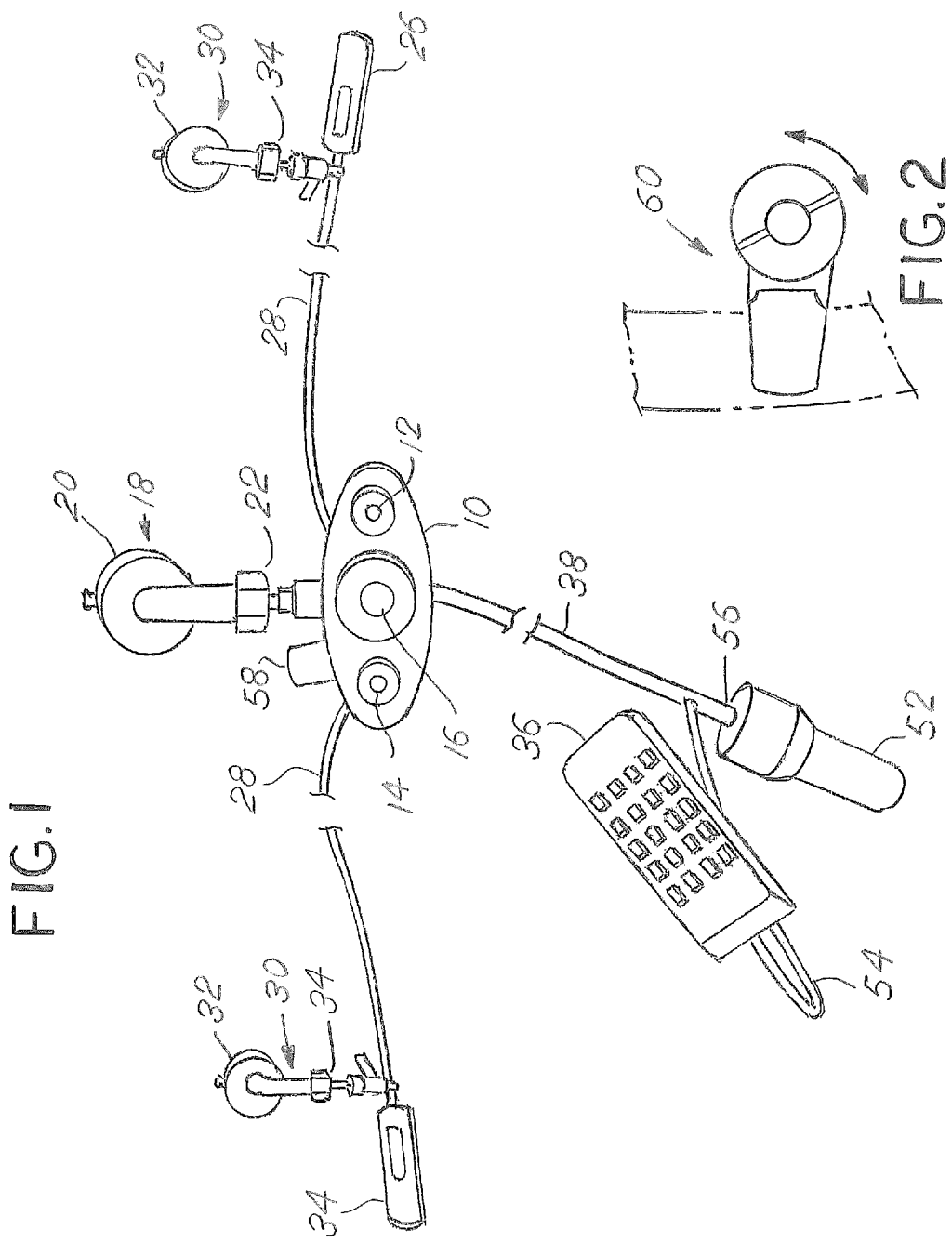

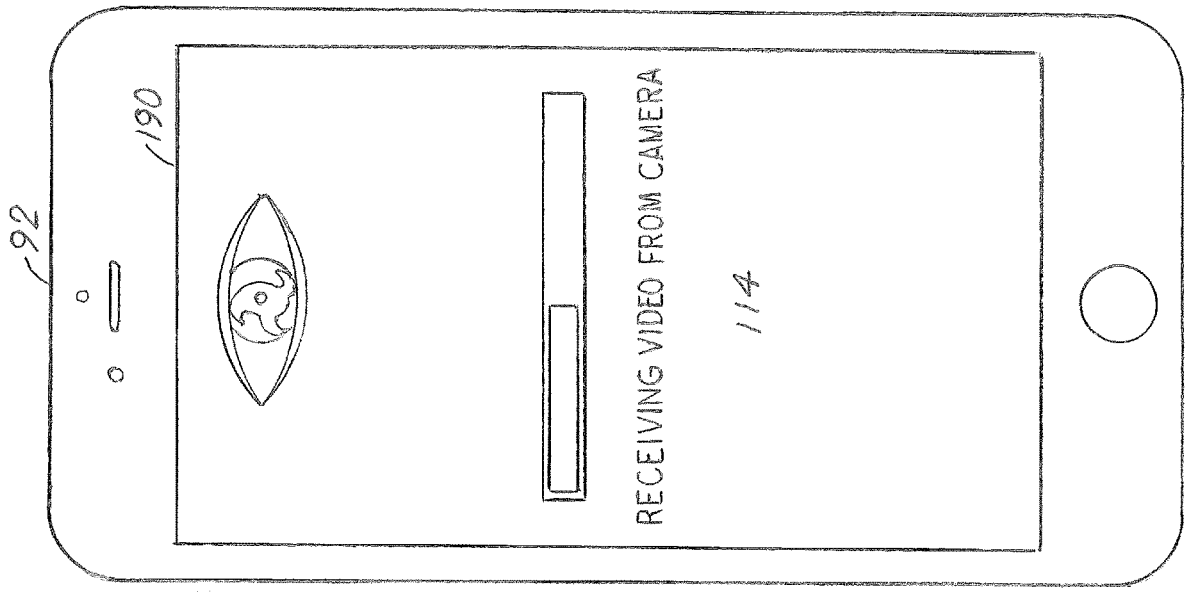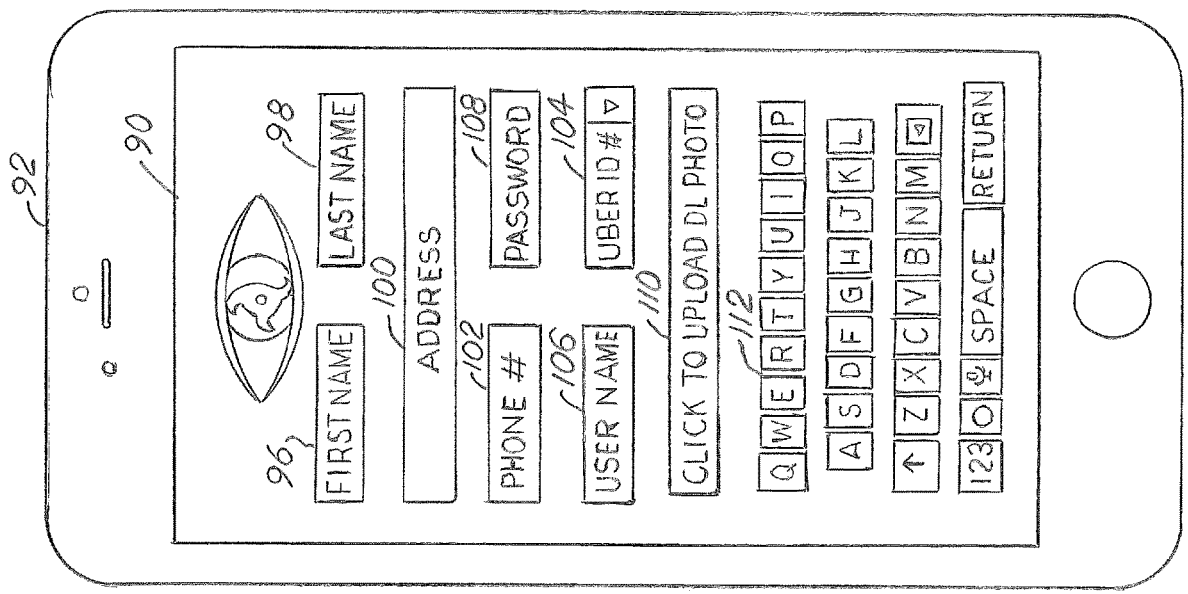

IWITNESS

BACKGROUND OF THE INVENTION

Driving a motor vehicle is an everyday activity for many people and presents a significant safety risk. While operating a motor vehicle, drivers have to account for natural and man-made static obstacles (e.g., low-hanging tree limbs, fallen debris, guardrails, medians, etc.) and moving obstacles (e.g., other motor vehicles, pedestrians, etc.) to safely navigate on the roadways. These obstacles cause traffic-related deaths and injuries every day.

More often than not, other motor vehicles are the primary cause of traffic-related deaths and injuries. Jurisdictions enact traffic laws to help combat the safety risk posed by other motor vehicles; however, for these laws to work, drivers must obey them. Unfortunately, many non-compliant drivers do not obey traffic laws and enforcement mechanisms must be implemented.

Police departments issuing traffic citations are the primary enforcement mechanism but, as evidenced by the significant number of traffic-related deaths and injuries that continue to occur, these measures are not enough. Police personnel cannot constantly observe all the miles of roadways where motor vehicles operate because there are not enough existing police personnel to accomplish such a task. Additionally, police personnel have other public safety duties that require their attention and take them away from traffic law enforcement.

Drivers reporting traffic violations are another measure that can help ensure traffic law compliance and safer roadways when police are not present to observe the violation, but that enforcement mechanism is also limited. When a compliant driver observes a non-compliant driver breaking a traffic law or operating a motor vehicle in an unsafe manner the compliant driver can call the police to report the dangerous situation. However, the compliant driver must pull over to safely call the police and, in some jurisdictions, to avoid breaking traffic laws against mobile phone use while operating a motor vehicle. By the time the compliant driver pulls over to report the traffic violation and the police arrive at the location, the non-compliant driver has left the scene and the police cannot issue the traffic citation.

Potentially the police could issue a citation if the compliant driver remembers the non-compliant driver's license plate number, but such an approach creates evidentiary issues. The non-compliant driver will most likely deny committing the traffic violation and without additional witnesses or evidence, the authorities may not be able to demonstrate the non-compliant driver's guilt beyond a reasonable doubt. Thus, there exists a need for a system to document the non-compliant driver's infraction, so the documented violation can be used for evidence later.

SUMMARY OF THE INVENTION

The system disclosed herein allows compliant drivers, participants in this program, to document a non-compliant driver's traffic violation or other unsafe driving behavior. The Violation Recording System (VRS) includes one or more video cameras that can be mounted to a location in the compliant driver's vehicle (e.g., on the vehicle windshield). The one or more video cameras continuously record while the compliant driver is driving and communicates with a device such as a smart phone or laptop within the vehicle. The VRS uses this device as a gateway device to transfer data. In alternative embodiments, the control device or central recording unit may act as the control and gateway device. The control device, or central recording unit, has software installed in it to control the VRS. It sends instructions to the one or more video and picture cameras and receives video and pictures from those cameras. In addition, the central recording unit has a GPS receiver and a microphone for audio capability.

Software installed on the control device allows the compliant driver (sometimes referred to as the "user," "participant," "camera operator," "road camera operator" or "RCO") to activate an evidence-gathering mode of the VRS. Preferably, a control interface mounted to the vehicle steering wheel activates the evidence-gathering mode. Preferably, the control interface wirelessly communicates with the control device and comprises three buttons.

Once the evidence-gathering mode is activated, the control device communicates with the one or more video and picture cameras to receive a predetermined amount of pre-activation recorded footage and a predetermined amount of post-activation recorded footage from the cameras. Together, the pre-activation and post-activation recorded footage constitutes the infraction footage bundle. During the evidence-gathering mode, the infraction footage bundle is stored within the VRS in a non-volatile storage location in the internal memory of the control device, or central recording unit. Non-volatile storage is computer memory that maintains stored information even after the VRS has been turned off and back on.

The VRS also includes one or more still cameras to photograph the infraction. For example, the one or more still cameras may photograph the non-compliant driver's license plate or other relevant information about the infraction incident. Photographs taken by these one or more still cameras would be included as relevant data packaged and communicated to the VRC as part of the infraction capture data bundle.

The VRS also includes a Panic or Emergency Mode that allows the user to live-stream a disaster or crisis like a plane crash or a shooting or something happening inside the vehicle, such as an Uber or Lyft driver being attacked.

The VRC has a receiving device (e.g., a laptop or desktop computer, server, etc.) that receives the infraction capture data bundle. Once received, the VRC can review the infraction footage and any other relevant data included in the infraction capture data bundle to determine whether a traffic citation should be issued and/or other official action should be taken. For example, if the VRC determines a traffic violation occurred, it may send a traffic citation on behalf of law enforcement to the non-compliant driver or vehicle owner in the mail.

The VRS may also include other features discussed below and, in no way, should this summary of the invention be construed to limit or define the invention.

BRIEF DESCRIPTION OF THE DRAWINGS

FIG. 1 shows one embodiment of the hardware in the present VRS that may be installed in a user's vehicle;

FIG. 2 shows an embodiment of a control interface that may be used to activate the evidence gathering mode of the VRS;

FIG. 7A shows an embodiment of a graphical user interface (GUI) that may be utilized in a gateway device in the present VRS with information that may be submitted to a VRC;

FIG. 7B shows a view of the graphical user interface (GUI) shown in FIG. 7A indicating that video is being received from a camera;

DETAILED DESCRIPTION OF INVENTION

Figure 2A:
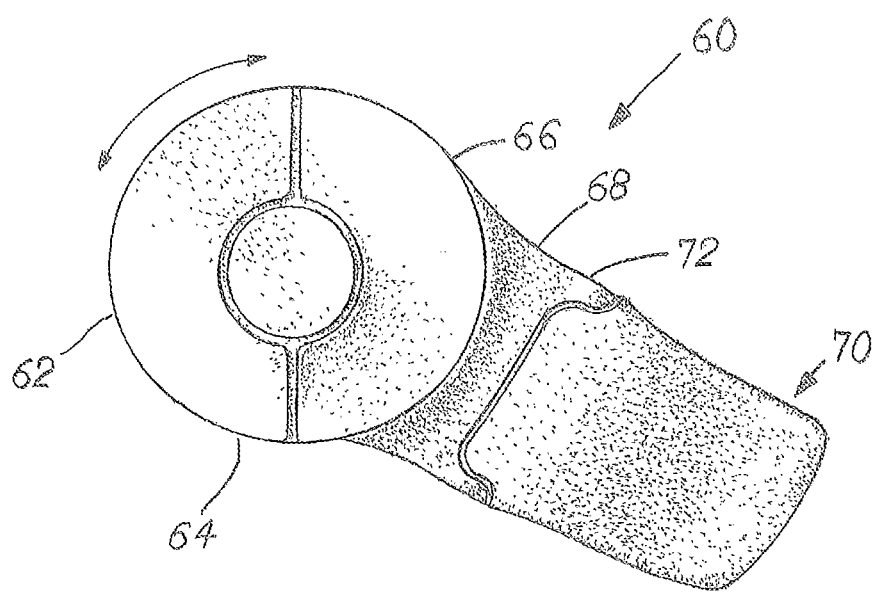
FIG. 2A is an enlarged view of the control interface shown in FIG. 2.

FIG. 1 shows an embodiment of the hardware in the present VRS that may be installed in a user's vehicle. In this embodiment, a central recording unit 10 includes a first video camera 12 that is preferably a wide angle, high definition video camera. The central recording unit 10 also includes a first still camera 14 and a second still camera 16. Preferably, the first and second still cameras 14, 16 have lenses with focal lengths different from each other so the still cameras 14, 16 are able to photograph a non-compliant driver's vehicle at a range of distances. For example, the first still camera 14 may have a focal length of 100 feet while the second still camera 16 has a focal length of 200 feet. The central recording unit, or control device 10 also includes a GPS receiver 58.

The central recording unit 10 also includes a mounting means 18 for securely mounting the central recording unit 10 to the user's vehicle. The mounting means 18 is any device that secures the central recording unit 10 on the vehicle so the unit 10 does not move out of its position on the vehicle during ordinary driving conditions. Preferably, the mounting means 18 is a suction cup 20 that attaches to the vehicle's windshield and does not permanently alter the vehicle, but the central recording unit 10 may be mounted to the vehicle in some other manner. For example, mounting means 18 may be a fastener, a clip, a magnet, or even a wedge or weighted object between the vehicle dashboard and windshield. The illustrated mounting means 18 also includes a ball and socket joint 22 between the suction cup 20 and the central recording unit 10.

A second video camera 24 and a third video camera 26 are connected to the central recording unit 10. In the illustrated embodiment the second and third video cameras 24, 26 are connected to the central recording unit 10 through a communication cable 28 that extends between the respective video cameras 24, 26 and the unit 10, but in other embodiments the communication may be wireless (e.g., Bluetooth, radio frequency, etc.) and the communication cable 28 may not be present.

The second and third videos cameras 24, 26 each include a mounting means 30 for securely mounting the cameras 24, 26 on the vehicle. The mounting means 30 is any device that secures the cameras 24, 26 on the vehicle so they do not move out of their position on the vehicle during ordinary driving conditions. Preferably, each of the mounting means 30 is a suction cup 32 that attaches to the vehicle's windshield and does not permanently alter the vehicle, but the second and third video cameras 24, 26 may be mounted to the vehicle in some other manner. For example, each mounting means 30 may be a fastener, a clip, a magnet, or even a wedge or weighted object between the vehicle dashboard and windshield. Each of the illustrated mounting means 30 also includes a ball and socket joint 34 between the suction cup 32 and the respective video camera 24, 26.

A control device may be contained within the central recording unit 10 and is also in communication with each of the cameras in the VRS. The control device is any programmable device capable of processing commands based upon signals from other components of the VRS and issuing commands to other components of the VRS. In the illustrated embodiment the control device is within the central recording unit as shown in FIG. 1.

In the illustrated embodiment, the gateway device 36 communicates with the control device via WiFi or through a central communication cable 38 that generally extends between the gateway device 36 and the control device 10. However, in alternative embodiments, the Control Device within the central recording unit may have its own data plan that will allow it to transfer data directly to the VRC, to eliminate the requirement for a separate gateway device 36. The control device 10 has a control circuit or module integrated into the central recording unit 10 that is operated by a control interface 60.

In the illustrated embodiment, the central communication cable 38 is connected to a vehicle's 12-volt power source or cigarette lighter (not shown) through a power adapter 52 and a secondary cable 54 extends from the communication cable 38 to the gateway device 36. The secondary cable 54 allows the gateway device 36 to receive communications from the central communication cable 38 and allows the gateway device 36 to receive power from the power adapter 52. The power adapter 52 may also have an additional communication port 56 such as a USB port.

The central communication cable 38 transfers power from the power adapter 52 to the first video camera 12 and the first and second still cameras 14, 16 in the central recording unit 10. Power through the central communication cable 38 from the power adapter 52 also powers the second and third videos cameras 24, 26, via the communication cable 28 from the central recording unit 10 to the respective cameras 24, 26.

Further, in alternative embodiments, such as with wireless communication, the cameras 12, 14, 16, 24, 26 may be battery powered or may be individually wired to separate power sources in the vehicle.

Also depicted in FIG. 1 is the control interface 60 for activating the evidence-gathering mode of the VRS. The control interface 60 is best shown in FIG. 2. In the illustrated embodiment, the control interface 60 comprises a left button 62, a middle button 64, and a right button 66 mounted on a member 68 that attaches to the vehicle's steering wheel with a clamp 70 or similar attachment means. Preferably, the buttons 62, 64, 66 are rotationally mounted to the member 68 so they can rotate about an axis and maintain their left-middle-right orientation no matter where on the steering wheel the button is mounted.

Preferably, the control interface 60 is battery powered and communicates wirelessly with the control device in the central recording device 10. However, in alternative embodiments, where not mounted on a steering wheel, the control interface may be powered through a cable from a power source within the vehicle and may communicate with the control device through a communication cable. For example, the control interface 60 may be wired to receive power from the power adapter 52 (see FIG. 1) and wired to communicate with the control devices 10, similar to the communication and power delivery previously described for the central recording unit 10 and the cameras in the VRS. Additionally, the control interface 60 is preferably mounted on the vehicle steering wheel but may be located in other areas within the vehicle in alternative embodiments.

Figure 3:
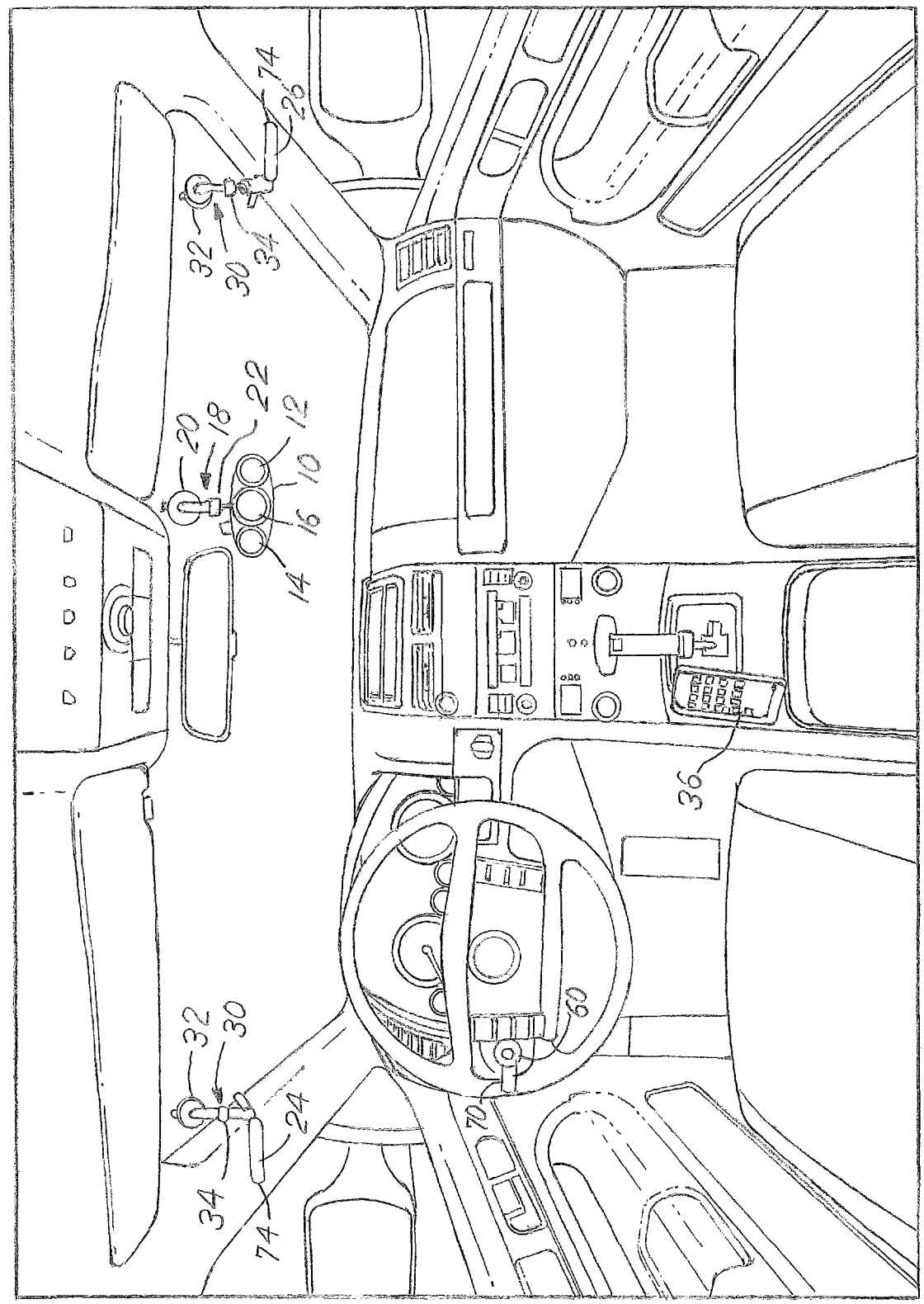
FIG. 3 shows how the hardware depicted in FIG. 1 may be installed in the user's vehicle.

FIG. 3 shows the preferred placement of the various components in the VRS, with the various communication cables not shown. As shown, the suction cup 20 of the mounting means 18 for the central recording unit 10 is positioned on the upper portion of the vehicle windshield, adjacent the rear view mirror on the passenger side of the mirror. The central recording unit 10 is preferably oriented with the lenses of all the cameras 12, 14, 16 all pointing in a generally straight and forward direction out of the vehicle windshield to capture non-compliant driver's vehicle in front of the compliant driver's vehicle, but for illustration purposes, the respective lenses of the cameras 12, 14, 16 are shown facing the rear of the vehicle in FIG. 3. The direction of the lenses can be adjusted using the ball and socket joint 22 to ensure non-compliant drivers' vehicles in front of the compliant driver's vehicle are properly captured.

The second video camera 24 is positioned on the driver side of the vehicle and the third video camera 26 is positioned on the passenger side of the vehicle. In both instances, the suction cup 32 of the mounting means 30 for each respective camera 24, 26 is positioned on the upper portion of the vehicle windshield, with each respective camera 24, 26 preferably oriented so its lens 74 points in an angled, rearward direction out of the vehicle's side windows to capture vehicles passing the compliant driver's vehicle in the adjacent lane, driving while texting or talking on the phone, and the non-compliant driver's face. In this regard, the second video camera 24 is oriented with its lens 74 pointed in an angled, rearward direction out of the driver side window, while the third video camera 26 is oriented with its lens 74 pointed in an angled, rearward direction out of the passenger side window. The orientation of both cameras 24, 26 can be adjusted using the ball and socket joint 34 to ensure the cameras 24, 26 adequately capture non-compliant drivers' vehicles passing the compliant driver's vehicle in the adjacent lane are properly captured.

Alternatively, however, the second and third video cameras 24, 26 could be oriented with their lenses facing out of the windshield, to the front-left and front-right of the RCO's vehicle, or with their lenses facing into the interior of the vehicle.

Also shown in FIG. 3, the gateway device 36 is placed in the center console area of the vehicle and the control interface 60 is mounted onto the vehicle steering wheel with clamp 70. Although not shown, a radar gun could be mounted in the vehicle and coupled to the central recording unit 10 and/or the control device. When present, the radar gun allows certain users (e.g. police officers, etc.) to capture speeding infractions.

During operation, the video cameras 12, 24, 26 in the VRS continuously record video when they receive power. The buttons 62, 64, 66 activate the evidence-gathering mode of the VRS so the system knows to save the infraction footage and photographs of an infraction. When the compliant driver witnesses an infraction and presses one of the buttons 62, 64, 66, the control interface 60 sends a signal that is preferably wireless (e.g., a Bluetooth signal, RF signal, etc.) to the control device 10 and the control device 10 directs each of the applicable video cameras 12, 24, 26 to save the infraction footage. In this regard, the control device 10 instructs the applicable video camera to save a configurable amount of video footage and pictures after the button is pressed and a configurable amount of video footage and pictures before the button was pressed.

The control interface 60 may be designed so the buttons are intuitively correlated with the cameras required to record the infraction in the evidence-gathering mode. For example, for infractions occurring in the driving lane to the left of the compliant driver's vehicle, pressing the left button 62 on the illustrated control interface 60 causes the VRS to save infraction footage from the second video camera 24 (i.e., the driver side camera) and the first video camera 12, and the still cameras 14, 16 in the central recording unit 10. Similarly, for infractions occurring in the driving lane to the right of the compliant driver's vehicle, pressing the right button 66 on the illustrated control interface 60 causes the VRS to save infraction footage from the third video camera 26 (i.e., the passenger side camera) and the first video camera 12, and the still cameras 14, 16 in the central recording unit. Finally, for infractions occurring directly in front of the compliant driver's vehicle, pressing the middle button 64 on the illustrated control interface 60 causes the VRS to save infraction footage from the first video camera 12, and the still cameras 14, 16 in the central recording unit 10. Accordingly, which video camera(s) take part in the evidence-gathering mode is intuitively correlated to the button placement on the illustrated control interface 60.

Each of the video cameras 12, 24, 26 in the VRS must continuously record and store video footage, as well as the still picture cameras 14 & 16, because infractions by non-compliant drivers are unpredictable and, by the time the compliant driver activates the evidence-gathering mode of the VRS, the infraction may already be completed. However, continuous recording and storing the video and picture footage will eventually exhaust the VRS's memory storage capabilities, meaning the VRS will be unable to record and store any more footage unless prior footage is deleted thereby freeing memory storage space. One possible way to handle this issue is for the compliant driver to manually delete the prior footage, but this approach requires the user to constantly monitor the available storage space. Alternatively, the VRS can use a loop recording scheme with programmable logic to automatically delete prior footage that does not contain an infraction and allocate the freed storage space to future recordings.

Figure 4:
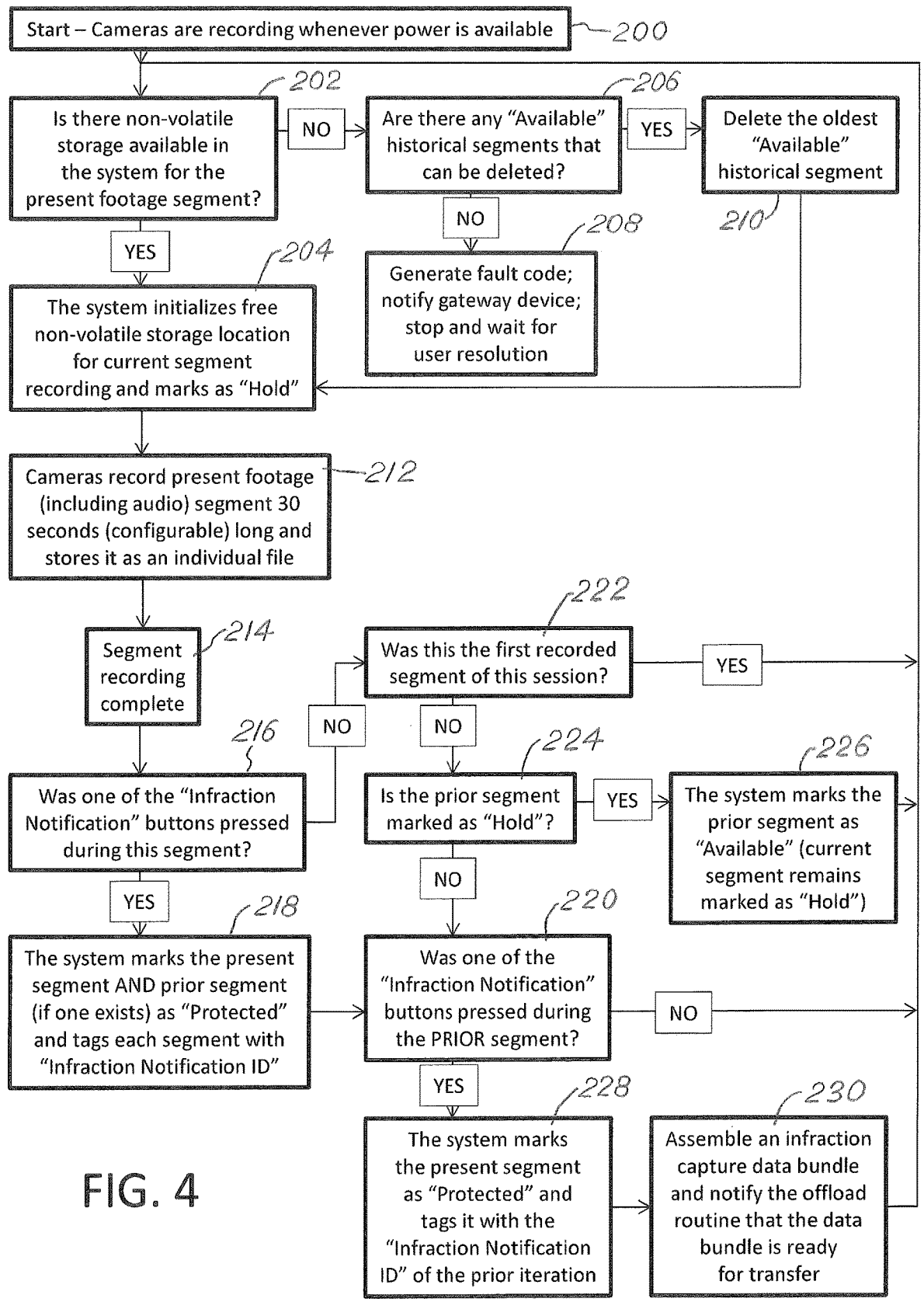
FIG. 4 shows an example of logic that may be used to record and save an infraction capture once the evidence-gathering mode of the VRS has been activated.

FIG. 4 illustrates a flowchart that provides an example of logic that could be used for a looped recording scheme. The logic directs the VRS to record the footage in configurable segments of time (e.g., thirty second segments). The flowchart refers to the "present footage segment" (also known as the "current footage segment"), the "prior footage segment," and the "next footage segment." The present or current footage segment is the footage segment currently being recorded, the prior footage segment is the footage segment recorded immediately before the present footage segment, and the next footage segment is the footage segment immediately after the present footage segment. This tags data for later retrieval that is a predetermined time before a button 62, 64, 66 was pressed on the control interface 60 and for a predetermined time after a button 62, 64, 66 was pressed on the control interface 60.

Additionally, all footage segments in the logic will be marked with a status of "available," "hold," or "protected," at any given time. These status markers tell the VRS whether a previously recorded footage segment can be reallocated for the present footage segment to record. A footage segment marked as "available" can be recorded over, while a footage segment marked as "hold" or "protected" cannot. A footage segment marked as "hold" may eventually be recorded over, but a footage segment marked as "protected" will not be recorded over unless and until the protected footage segment has been successfully offloaded to the VRC.

The logic starts at step 200 where the video cameras are recording whenever the VRS is turned on and power is available to the cameras. In step 202, the logic queries whether enough non-volatile storage is available on the cameras (or other memory locations) for the present footage segment to record. If the answer is yes, the logic proceeds to step 204. If the answer to step 202 is no, the logic proceeds to step 206 where the logic queries whether there are any previously recorded footage segments (i.e., "historical segments") marked as "available." If the answer is no, the logic proceeds to step 208, where the VRS generates a fault code notifying the gateway device 36 of the error and the VRS awaits user resolution. If one or more historical segments are marked "available," the logic proceeds to step 210, where the oldest historical footage segment marked "available" is deleted, thereby freeing a non-volatile storage location. The logic then proceeds to step 204.

In step 204, the VRS initializes a free non-volatile storage location to record the present footage segment and marks the non-volatile storage location as "hold." The logic then proceeds to step 212, where the cameras record the present footage segment and store the footage segment as an individual file. As indicated in step 212, the length of time for the footage segment is a configurable value, and the footage segment could be shorter or longer depending on VRS design. Additionally, as noted in step 212, the footage segment recording may include audio.

In step 214, recording of the present footage segment is completed and the logic proceeds to step 216, where the logic queries whether the evidence-gathering mode of the VRS was activated (e.g., was one of the "Infraction Notification" buttons 62, 64, 66 on the control interface 60 pressed) while the present footage segment was recorded. If yes, the logic moves to step 218 where the VRS changes the marking of the present footage segment and the prior footage segment from "hold" to "protected" and tags both the prior and present footage segments with an "Infraction Notification ID." The logic then proceeds to step 220.

If the answer to step 216 is no, the logic proceeds to step 222 where it queries whether the present footage segment is the first recorded footage segment of the session (e.g., the first recorded footage segment since power was initialized). If the answer is yes, the logic proceeds back to step 202. If the answer to step 222 is no, the logic proceeds to step 224 where it queries whether the prior footage segment is marked "hold." If the answer is yes, the logic moves to step 226 where the VRS marks the prior footage segment as "available" and the logic then proceeds back to step 202. If the answer to step 224 is no, the logic proceeds to step 220.

In step 220, the logic queries whether the evidence-gathering mode of the VRS was activated (e.g., was one of the "Infraction Notification" buttons 62, 64, 66 on the control interface 60 pressed) while the prior footage segment was recorded. If the answer is no, the logic proceeds back to step 202 so the VRS can record the next footage segment. If the answer is yes, the logic proceeds to step 228.

In step 228, the logic instructs the VRS to change the marking of the present footage segment from "hold" to "protected" and tags the present footage segment with an "Infraction Notification ID" of the prior iteration. The Infraction Notification ID of the prior iteration is the Infraction Notification ID the logic assigned in step 218 during the prior iteration of the logic. In other words, for example, if the prior iteration of the logic assigned an Infraction Notification ID in step 218 to footage segments A & B, with footage segment A being the "prior segment" and footage segment B being the "present segment" during that prior iteration, in step 228 the current iteration of the logic would assign segment C, which is considered the present footage segment in the current iteration, the same Infraction Notification ID that was assigned to footage segments A & B. The logic then proceeds to step 230.

After step 228, the logic proceeds to step 230, where it instructs the VRS to assemble an infraction capture data bundle and notifies the offload routine that the data bundle is ready for transfer. Concerning the former, the infraction capture data bundle includes those footage segments with matching Infraction Notification IDs, which, together, constitute the infraction footage, and any other relevant data (e.g., the GPS location where the infraction footage was taken, check sum values, the exact time the evidence-gathering mode was activated, the RCO's speed at the time the evidence-mode was activated, and chain of custody signing data). Concerning the latter, the logic notifies the VRS's offload routine asynchronously that an infraction capture data bundle is ready for transfer to a location remote from the control device, such as a VRC. After step 230, the logic proceeds back to step 202 and continues to run so the VRS is available to capture subsequent infractions.

Video segments may be tagged with more than one Infraction Notification ID and may be part of more than one infraction capture data bundle, depending on when subsequent infractions occur. If a subsequent infraction occurs during the subsequent iteration of the logic immediately after step 230, the user will activate the evidence-gathering mode of the VRS during the next video segment after step 230 and, in step 218, the logic will tag the next video segment (which is now considered the present video segment for the subsequent iteration of the logic) and tag what was formerly the present video segment in the previous iteration of the logic (which is now considered the prior video segment for the subsequent iteration of the logic) with a new Infraction Notification ID. Thus, the video segment that was considered the present video segment in the previous iteration and is considered the prior video segment in the subsequent iteration will have two different Infraction Notification IDs and will be part of two different infraction capture data bundles created in step 230.

Figure 5:
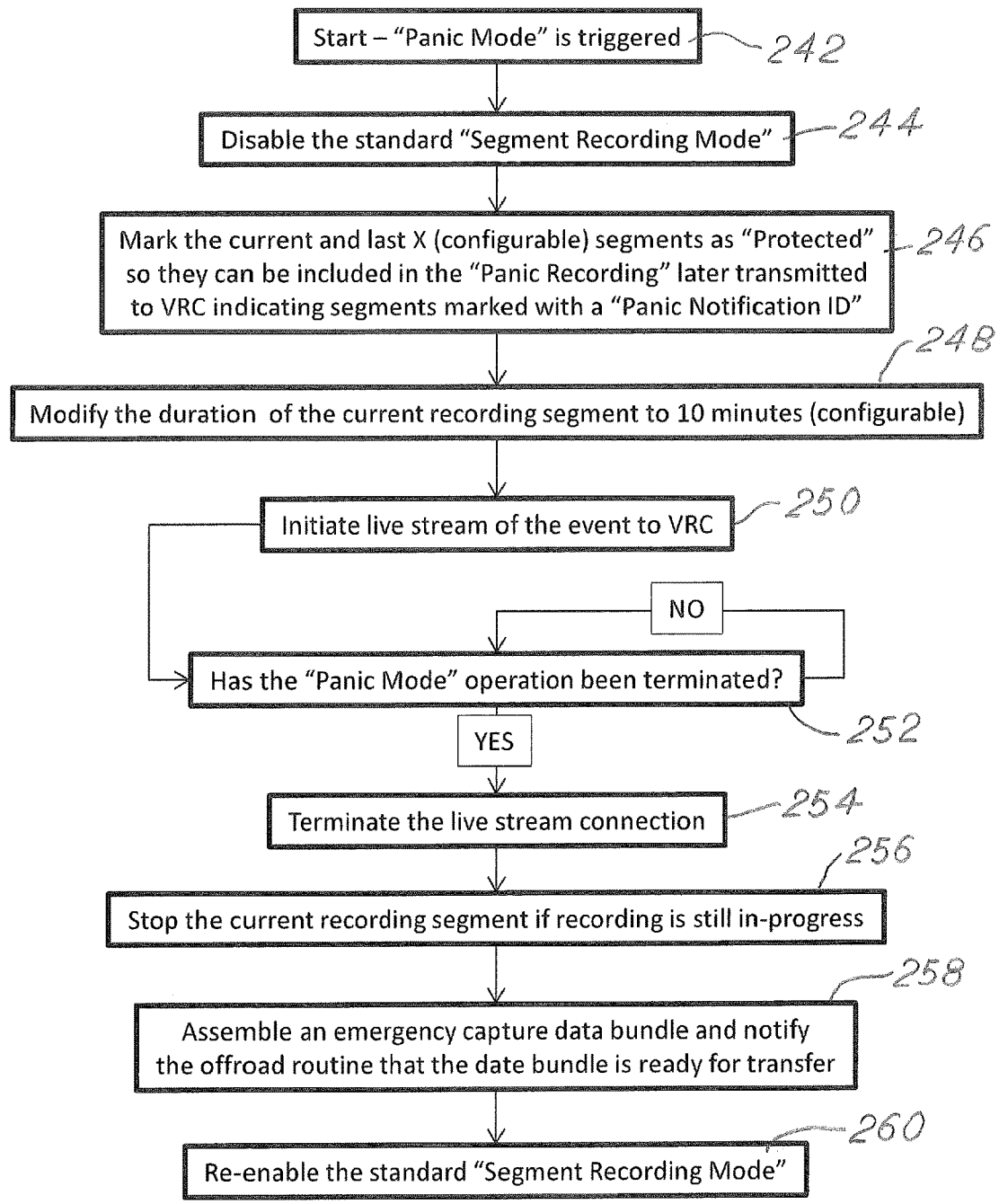
FIG. 5 shows an example of logic that may be used to implement a panic or emergency mode operation of the VRS.

FIG. 5 illustrates an example of logic used to implement panic mode operation available in an embodiment of the VRS. A compliant driver using the VRS may decide to activate panic mode if the driver sees something that would be considered a disaster or crisis, like a plane crash or a shooting. In panic mode, the footage being captured is livestreamed through the gateway device to a VRC from the compliant driver's vehicle. Persons at the remote location may then notify and/or pass the livestreamed footage to the appropriate authority so the authority can respond. Additionally, panic mode may be appropriate if something happened inside the vehicle, such as an Uber of Lyft driver being attacked, in which case at least one additional camera (not shown) positioned to record activity inside the compliant driver's vehicle would operate to livestream and record the activity inside the compliant driver's vehicle.

Entering into panic mode operation overrides the VRS's infraction recording logic and follows panic mode logic. Preferably, the panic mode logic instructs the VRS to livestream footage (here, in panic mode, footage includes video, photos, audio, GPS, time etc.) of the emergency situation for a configured period of time and to record footage of the emergency situation for a configured period of time, such as the logic shown in FIG. 5.

In step 242, the user activates panic mode operation. Panic mode operation may be activated in any manner known in the art for activating alternate logic sequences. For example, it may be activated by pressing a particular sequence of the buttons 62, 64, 66 on the control interface 60, by pressing one or more of the buttons 62, 64, 66 on the control interface 60 for a particular period of time, by pressing two or more buttons 62, 64, 66 at the same time, through voice commands, accelerometers within the VRS (e.g. if a RCO gets into an accident) or in some other manner.

After panic mode activation in step 242, the logic proceeds to step 244, where the logic directs the VRS to disable the standard segment recording mode for infraction captures. The logic then proceeds to step 246, where the logic marks as "protected" the current (also known as the present) footage segment and a configurable number of previous footage segments, and tags each of these segments with a "Panic Notification ID." Marking the footage segments as protected and assigning them a Panic Notification ID allows them to be included within an emergency capture data bundle for transfer to the VRC.

After step 246, the logic proceeds to step 248 where it modifies the duration of the current recording segment. In this regard, the logic instructs the VRS to continue recording the current segment for a configured period of time (e.g., ten minutes). The logic then proceeds to step 250 where it instructs the VRS to initiate live footage streaming of the emergency situation or event to the VRC.

After step 250, the logic proceeds to step 252 where it queries whether the "Panic Mode" operation has been terminated by the user (e.g., because the emergency situation has ended). If the answer is no, the logic loops back to step 252 and will continue to loop back until the answer to step 252 is yes. If the answer to step 252 is yes, the logic proceeds to step 254, where it terminates the live stream connection with the VRC. The logic then proceeds to step 256, where it stops the current recording segment if the current segment is still in progress.

After step 256, the logic proceeds to step 258, where it instructs the VRS to assemble an emergency capture data bundle and notifies the offload routine that the data bundle is ready for transfer. Concerning the former, the emergency capture data bundle includes those footage segments with matching Panic Notification IDs and any other relevant data (e.g., video, the photographs from the still cameras 14, 16, the GPS location where the footage was taken, check sum values, the exact time the Panic Mode operation activated, the RCO's speed at the time the Panic Mode operation was activated, and chain of custody signing data). Concerning the latter, the logic notifies the VRS offload routine asynchronously that an emergency capture data bundle is ready for transfer to the VRC.

After step 258, the logic proceeds to step 260, where it re-enables the standard segment recording mode for infraction captures and the panic mode (also known as the panic handler) terminates.

Concerning the creation of the capture data bundle in steps 230 and 258, the central recording unit 10 handles all intercommunication between the video cameras, still cameras and any other data capture devices (e.g., radar gun). The video and still cameras may have their own non-volatile memory. In the scenario where all data is stored in the central recording unit 10, the central recording unit aggregates all of the relevant data into a single file (e.g., tar or compressed zip file) and conveys that information to the VRC via the gateway device 36. Alternatively, if each camera stores the recordings/photos locally, the central recording unit will transfer the data from each device into its own non-volatile memory and then follow the same aggregation step detailed above.

Figure 6:
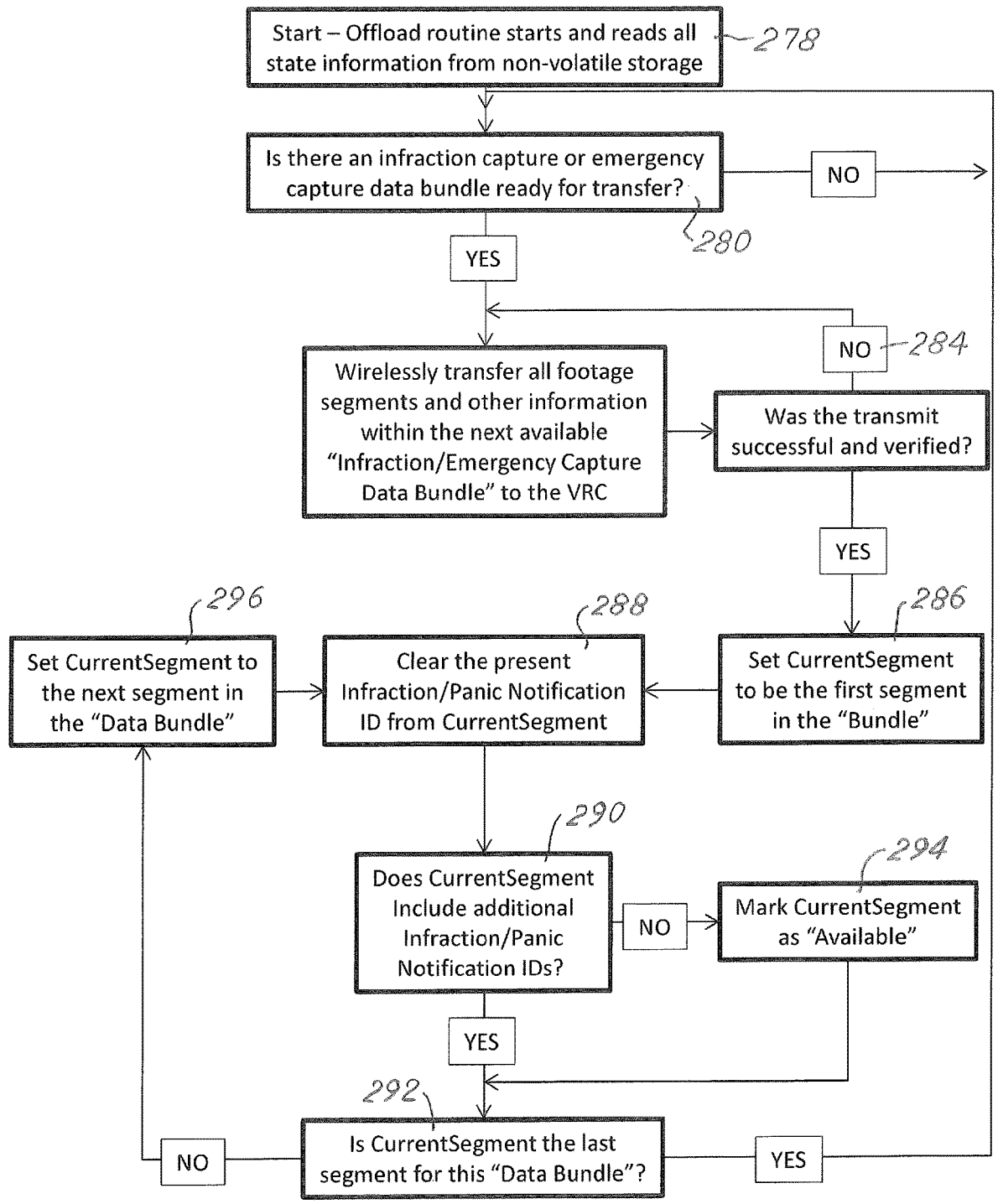
FIG. 6 shows an example of logic that may be used to implement the transfer of an infraction capture data bundle or transfer of an emergency capture data bundle to the VRC through an offload routine.

FIG. 6 shows an example of offload routine logic that may be employed to implement transfer of the infraction capture data bundle or transfer of the emergency capture data bundle to the VRC. The offload routine is any logic that allows the infraction capture data bundles and/or the emergency capture data bundles stored in the VRS to be downloaded or uploaded to the VRC.

In step 278 the offload routine logic starts and reads all state information from non-volatile storage. The offload routine starts automatically when there is a bundle ready to be transferred to the gateway or may start based on user instruction (e.g., instruction given through a button on the control device).

After step 278, the logic proceeds to step 280, where it queries whether one or more infraction capture or emergency capture data bundles is ready for transfer. If the answer is no, the logic loops back around to step 278. If the answer is yes, the logic proceeds to step 282.

In step 282 the offload routine transfers all data within the next available data bundle or the next available emergency capture data bundle to the VRC.

After step 282, the logic proceeds to step 284 where it queries whether the present data bundle was successfully transmitted to the VRC. If the answer is yes, the logic proceeds to step 286. If the answer to step 284 is no, the logic proceeds back to step 282.

In step 286, the logic sets the first video segment in the present data bundle as the "Current Segment" and then proceeds to step 288.

In step 288, the logic clears from the Current Segment the Infraction/Panic Notification ID associated with the present Infraction/Emergency Capture Data Bundle that was transferred to the VRC in step 282. The logic then proceeds to step 290.

In step 290, the logic queries whether the Current Segment includes any additional Infraction/Panic Notification IDs. If the answer to step 290 is yes, the logic proceeds to step 292. If the answer to step 290 is no, the logic proceeds to step 294, where it marks the Current Segment as "available." After step 294, the logic proceeds to step 292.

In step 292, the logic queries whether the Current Segment is the last segment for the present data bundle that was offloaded in step 282. If the answer is no, the logic proceeds to step 296, where it sets the Current Segment to the next video segment within the data bundle that was offloaded in step 282, and then proceeds back to step 288. If the answer to step 292 is yes, the logic returns back to step 280 to begin offloading the next data bundle.

Figure 7D:
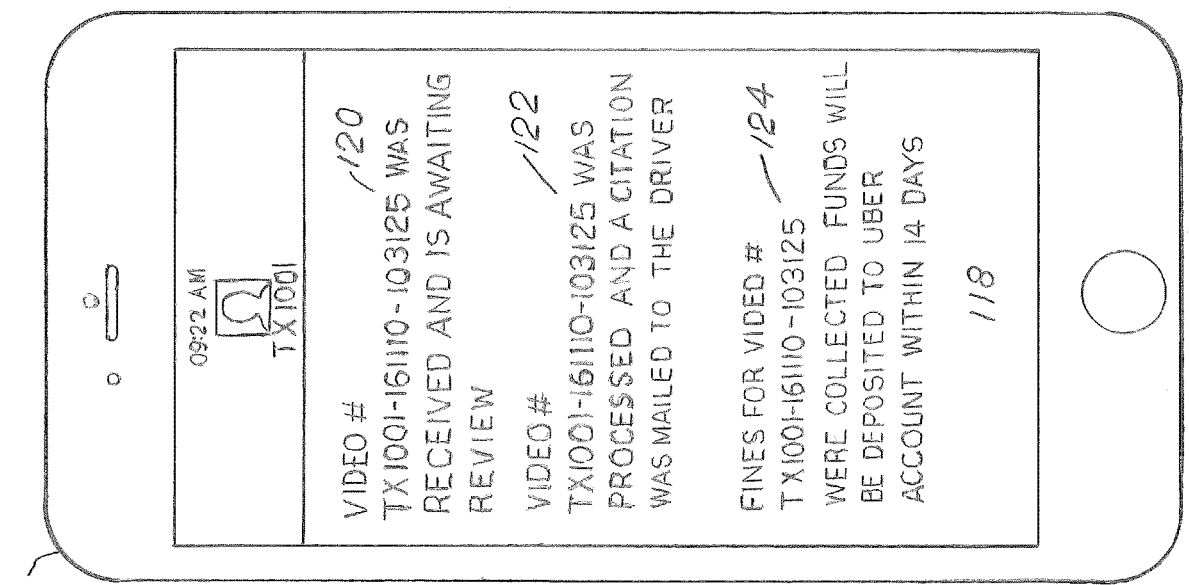
FIG. 7D shows a view of the graphical user interface (GUI) shown in FIGS. 7A-7C indicating that data was received at the VRC.
Figure 7C:
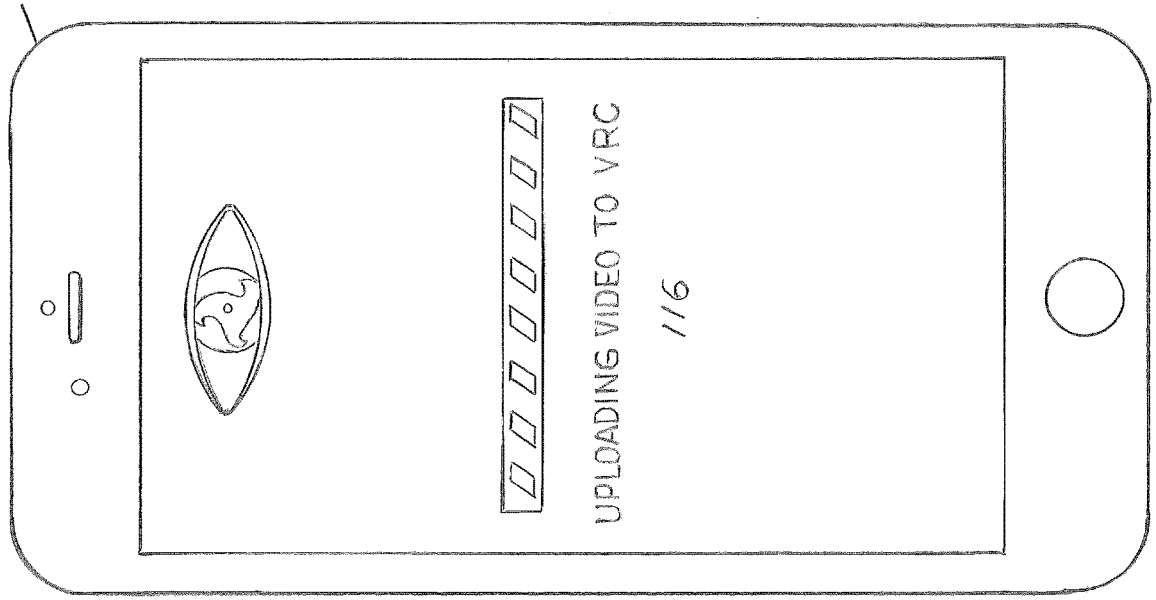
FIG. 7C shows a view of the graphical user interface (GUI) shown in FIGS. 7A-7B indicating that video is being uploaded to the VRC.

FIG. 7 illustrates several graphical user interfaces (GUIs) that could be used on the gateway device 36 for RCO's to create profiles, and to show status updates of data bundles being offloaded to the VRC, as well as notifications being received from the VRC. In the illustrated embodiment the GUIs appear on a touchscreen 90 of a smartphone 92, after the user or participant in the program (i.e., the compliant driver) downloads application software to the smart phone 92, designed to interact with the system.

In a first GUI 94, the user or participant in the program can upload identifying information into the system. The specific identifying information required by the system can vary, but in the illustrated embodiment the identifying information comprises a first name field 96, a last name field 98, an address field 100, a phone number field 102, a user ID field 104 (e.g. an UBER ID, Lyft ID, Police Badge Number, Driver's License Number, etc.), a username field 106, and a password field 108. Additionally, the illustrated embodiment contains driver's license photo upload field 110 and a touchscreen keyboard 112 for uploading the information required by the fields.

Once the fields are populated with the required identifying information, the identifying information may be wirelessly communicated to the VRC.

In a second GUI 114, the gateway device 36 is receiving infraction footage from the central recording unit after the evidence-gathering mode has been activated. In a third GUI 116, the VRS is uploading the footage of the infraction capture data bundle to the VRC.

A fourth GUI 118 shows text message updates the user may receive on the gateway device 36. In a first message 120, the GUI 118 shows an infraction capture data bundle has been received by the VRC and is awaiting review. In a second message 122, the GUI 118 shows the infraction capture data bundle has been reviewed and a citation was mailed to the non-compliant driver. And, in a third message 124, the GUI 118 shows the fine for the applicable citation(s) were received from the non-compliant driver and funds will be deposited into the compliant driver's account within a specified period of time (e.g., within 14 days).

Figure 8:
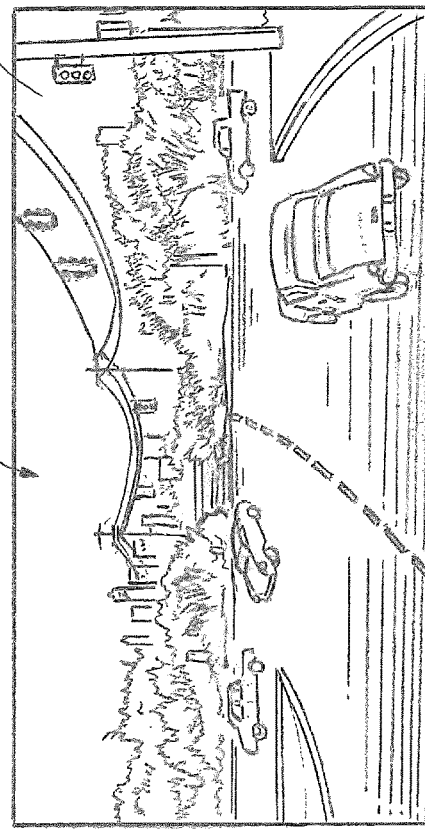
FIG. 8 shows an embodiment of a graphical user interface that may be installed on a receiving device of the VRC or another appropriate authority in the present system.

FIG. 8 shows a GUI 126 that may be utilized at the VRC. A first window 128 shows the video and still photographs from an infraction capture data bundle sent to the VRC by the compliant driver/user. A data analyst at the VRC can review the video and the still photos from the data bundle and input the necessary information to process a citation into a second window 130, which is below the first window in the illustrated embodiment.

The second window 130 contains fields with information input by the data analyst or auto-populated from information within the data bundle. Information within the data bundle auto-populates field 132 with an Infraction ID #. The data bundle is preferably assigned a unique identifier that includes the RCO identification number, the date the RCO took the video footage, and the time the RCO entered into the evidence-gathering mode (or panic mode), in military time.

Below the Infraction ID field 132 is a date of violation field 134, a time of violation field 136, a date of review field 138, a license plate field 140, a state plate field 142, a city of violation field 144, a number of violations field 146, a first violation code field 148, and a second violation code field 150. The data analyst may input the date and time of the infraction, and the date the analyst reviewed the infraction footage, in the date of violation field 134, the time of violation field 136, and the date of review field 138 if the analyst decides an infraction is present after he/she reviews the infraction footage in the first window 128. The analyst will then input the license plate number of the non-compliant driver's vehicle in the license plate field 140 and identify the state that issued the plate in the state plate field 142, based on the infraction footage and/or still photographs of the non-compliant driver's license plate. Additionally, the analyst will select the city where the infraction occurred in the city of violation field 144, select the number of infractions that occurred in the number of violations field 146, and specify in the first and second violation code fields 148, 150 the traffic code sections violated, based on the traffic code from the city where the infraction occurred. Additional violation code fields may appear depending on the number of violations the analyst identified in the number of violations field 146.

To the right of the video ID field 134 is a RCO ID field 152, which gives the identification number of the RCO who captured the infraction. Below the RCO ID field 152 is the analyst field 154 and the analyst ID field 156 which, together, identify the analyst reviewing the infraction footage to determine if a traffic violation occurred. Additionally, a RCO rating field 158 rates the past accuracy of the RCO who reported the infraction and the RCO notification field 160 indicates the RCO has been notified the analyst is reviewing the infraction footage.

Appearing below the RCO notification field 160 is an area 162 for notifying analyst if non-compliant driver is wanted by the authorities for other crimes. This area 162 allows the analyst to immediately contact the proper authorities and notify them if the non-compliant driver is wanted by law enforcement.

A third window 164, which is to the right of the first window 128 in the illustrated embodiment, contains fields with information the analyst inputs or information auto-populated into the field. A mail date field 166 contains the date a citation was mailed to the non-compliant driver who committed the infraction(s). A license plate field 168, a name of vehicle owner field 170, address of vehicle owner fields 172, 174, and a vehicle make and body field 176 contain information auto-populated into the applicable fields after a license plate search is conducted. In this regard, after the analyst inputs the license plate number and license plate state into the applicable fields 140, 142 in the second window 130, the analyst clicks on a search plate button 178 and the database of registered vehicles from the state issuing the license plate is searched. The information revealed from this search then auto-populates into the appropriate fields in the third window 164 and the data analyst can compare the auto-populated information with the infraction footage from the infraction capture data bundle to confirm they match.

The third window 164 also contains a color of vehicle field 180 which, based on the infraction footage, the analyst can input or it can be auto-populated. Additionally, the analyst can input into a location of violation(s) field 182, the location where the violation(s) in the infraction footage occurred, or it can be auto-populated. A map 184 derived from GPS coordinates within the data bundle appears on the GUI 126 and the map 184, in combination with the infraction footage, helps the analyst identify the location of the violation(s).

Further, the third window 164 contains an ordinance(s) field 186 and a description(s) field 188, which, respectively, set forth the particular ordinance(s) violated and description(s) of the violation(s). The ordinance(s) field 186 (auto-populated) includes those ordinances identified by the analyst in the violation code fields 148, 150 from the second window 130 and the description(s) field 188 (auto-populated) gives a brief description of the violations based on the traffic ordinance(s) of the particular jurisdiction where the violation occurred.

Finally, when the analyst has completed his/her review of the infraction footage, the analyst clicks on a submit button 190, which reports the violation(s) to the appropriate law enforcement authority for further action. Then, if an infraction is confirmed, the applicable information will be included in the citation and mailed out to the non-compliant driver by the VRC or the applicable law enforcement department. If the data analyst decides an infraction did not occur and declines to approve a citation, the system can save that report to track the RCO's performance record.

What is claimed is:

1. A method of recording and reporting traffic violations comprising the steps of:
    providing a central recording unit having a control device, first video camera, a first still camera, and a second still camera, said first and second still cameras having different focal lengths, said central recording unit including a GPS receiver;
    mounting said central recording unit to a vehicle;
    providing a second video camera remotely located from said central recording unit;
    providing a third video camera remotely located from said central recording unit;
    connecting said second and third video cameras to said central recoding unit to facilitate communication between said second and third video cameras and said central recording unit;
    providing a gateway device that communicates with the control device;
    providing a control interface located remotely from said central recording unit, said control interface having a left button, middle button, and a right button, each of said buttons communicating a signal to said central recording unit when one of said buttons is pressed, said signal corresponding to one of said cameras;
    continuously recording video with each of said video cameras;
    continuously recording still pictures with said still cameras;
    storing video from said video cameras and still pictures from said still cameras in non-volatile memory;
    marking said still pictures and video stored in said non-volatile memory with a status identifier;
    pressing one of said buttons on said control interface and said pressed button communicating said corresponding signal and causing data taken by said corresponding camera to be identified with a protected status in said non-volatile memory;
    tagging said data with an infraction notification ID;
    assembling an infraction capture data bundle including said data and said infraction notification ID and tagging said infraction capture data bundle with a road camera operator ID;
    transmitting said infraction capture data bundle to a violation review center for processing;
    evaluating the data bundle at said violation review center;
    assigning rating to said road camera operator to determine the accuracy of information supplied and storing said rating of said road camera operator for future use;
    transmitting notification of violation to appropriate authorities upon determining a violation has occurred.

2. The method of recording and reporting traffic violations of claim 1, wherein said second and third video cameras are connected to said central recording unit with cables.

3. The method of recording and reporting traffic violations of claim 1, wherein said infraction capture data bundle includes data from a predetermined time before said button on control interface was pressed to a predetermined time after said button on said control interface was pressed.

4. The method of recording and reporting traffic violations of claim 3, wherein said gateway device is contained within said central recording unit.

5. A method of recording and reporting traffic violations comprising the steps of:
    providing a central recording unit having a control device, first video camera, a first still camera, and a second still camera, said first and second still cameras having different focal lengths, said central recording unit including a GPS receiver;
    mounting said central recording unit to a vehicle;
    providing a second video camera remotely located from said central recording unit;
    providing a third video camera remotely located from said central recording unit;
    connecting said second and third video cameras to said central recoding unit to facilitate communication between said second and third video cameras and said central recording unit;
    providing a gateway device that communicates with the control device;
    providing a control interface located remotely from said central recording unit, said control interface having a left button, middle button, and a right button, each of said buttons communicating a signal to said central recording unit when one of said buttons is pressed, said signal corresponding to one of said cameras;
    continuously recording video with each of said video cameras;
    continuously recording still pictures with said still cameras;
    storing video from said video cameras and still pictures from said still cameras in non-volatile memory;
    marking said still pictures and video stored in said non-volatile memory with a status identifier;
    pressing one of said buttons on said control interface and said pressed button communicating said corresponding signal and causing data taken by said corresponding camera to be identified with a protected status in said non-volatile memory;
    tagging said data with an infraction notification ID;
    assembling an infraction capture data bundle including said data and said infraction notification ID and tagging said infraction capture data bundle with a road camera operator ID corresponding to a road camera operator that produced said infraction capture data bundle;
    transmitting said infraction capture data bundle to a violation review center for processing;
    evaluating the data bundle at said violation review center to determine the accuracy of information within said infraction capture data bundle;
    recording the accuracy of said infraction capture data bundle and storing said recording of accuracy at said violation review center to be included in a history of said road camera operator;
    rating said road camera operator based on said history;
    transmitting notification of violation to appropriate authorities upon determining a violation has occurred.

6. The method of recording and reporting traffic violations of claim 5, wherein said second and third video cameras are connected to said central recording unit with cables.

7. The method of recording and reporting traffic violations of claim 5, wherein said infraction capture data bundle includes data from a predetermined time before said button on said control interface was pressed to a predetermined time after said button on said control interface was pressed.

8. The method of recording and reporting traffic violations of claim 7, wherein said gateway device is contained within said central recording unit.

\* \* \* \* \*